United States Patent
Gyobu (10) Patent No.: US 9,760,507 B2
(45) Date of Patent: Sep. 12, 2017

(54) DATA PROCESSING DEVICE AND DATA PROCESSING METHOD

(71) Applicant: Yoshikazu Gyobu, Kanagawa (JP)

(72) Inventor: Yoshikazu Gyobu, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 346 days.

(21) Appl. No.: 14/176,606

(22) Filed: Feb. 10, 2014

(65) Prior Publication Data

US 2014/0237148 A1 Aug. 21, 2014

(30) Foreign Application Priority Data

Feb. 19, 2013 (JP) ................................ 2013-030232

(51) Int. Cl.
*G06F 13/368* (2006.01)
*G06F 13/16* (2006.01)
*G06F 13/364* (2006.01)

(52) U.S. Cl.
CPC ........ *G06F 13/1657* (2013.01); *G06F 13/364* (2013.01)

(58) Field of Classification Search
USPC ................. 710/107, 119, 120, 123, 242, 243
See application file for complete search history.

(56) References Cited

U.S. PATENT DOCUMENTS

| | | | |
|---|---|---|---|
| 5,832,278 A * | 11/1998 | Pham ............................ | 710/243 |
| 6,615,291 B1 | 9/2003 | Kamei et al. | |
| 7,577,780 B2 * | 8/2009 | Huang et al. .................. | 710/116 |
| 8,650,347 B2 * | 2/2014 | Okada ........................... | 710/116 |
| 9,117,022 B1 * | 8/2015 | Chiu et al. | |
| 2004/0250003 A1 * | 12/2004 | Chang ........................... | 710/107 |
| 2005/0240707 A1 * | 10/2005 | Hayashi et al. ............... | 710/309 |
| 2008/0256285 A1 * | 10/2008 | Gyobu ........................... | 710/316 |
| 2011/0138092 A1 * | 6/2011 | Morimoto et al. ........... | 710/244 |
| 2012/0042110 A1 * | 2/2012 | Nakazono et al. ........... | 710/305 |
| 2012/0047299 A1 * | 2/2012 | Sasaki ........................... | 710/244 |
| 2012/0246368 A1 * | 9/2012 | Kwon et al. .................. | 710/110 |
| 2013/0254444 A1 | 9/2013 | Gyobu | |
| 2014/0201471 A1 * | 7/2014 | Cutter et al. .................. | 711/151 |

FOREIGN PATENT DOCUMENTS

| | | |
|---|---|---|
| JP | H11-184807 A | 7/1999 |
| JP | 2000276437 A | 10/2000 |
| JP | 2004-114330 | 4/2004 |

(Continued)

OTHER PUBLICATIONS

U.S. Appl. No. 13/948,695, filed Jul. 23, 2013.
Japanese Office Action dated Jan. 4, 2017.

*Primary Examiner* — Raymond Phan
(74) *Attorney, Agent, or Firm* — Harness, Dickey & Pierce, P.L.C.

(57) ABSTRACT

A data processing device includes a first sub-arbiter configured to arbitrate an access by first and second masters that access data stored in a memory; a second sub-arbiter configured to arbitrate an access to the memory by a plurality of masters other than the first and the second masters; a main arbiter configured to prioritize the access to the memory by the first sub-arbiter over the access to the memory by the second sub-arbiter; and a limiting unit configured to limit an amount of the access to the memory by the second master within a preset range.

18 Claims, 9 Drawing Sheets

(56) References Cited

FOREIGN PATENT DOCUMENTS

| JP | 2005316609 A | 11/2005 |
|----|--------------|---------|
| JP | 2010191492 A | 9/2010  |
| JP | 2001-307083  | 11/2011 |
| JP | 2012-027751  | 2/2012  |

* cited by examiner

DATA PROCESSING DEVICE AND DATA PROCESSING METHOD

CROSS-REFERENCE TO RELATED APPLICATION

The present application claims priority to and incorporates by reference the entire contents of Japanese Patent Application No. 2013-030232 filed in Japan on Feb. 19, 2013.

BACKGROUND OF THE INVENTION

1. Field of the Invention

The present invention relates to a data processing device and a data processing method.

2. Description of the Related Art

In recent years, a multifunction peripheral (MFP) has advanced in high speed performance. In an MFP, a scanning speed in a scanner and a writing speed in a plotter have been improved, which causes a difficulty in securing line isochronism (real time performance in data transfer on a line-by-line basis of image data) in data transference with a main memory.

Moreover, a chip has shrunk in an MFP. Since an IO function, a central processing unit (CPU), a display output function, and a graphic function are added in addition to functions for an MFP in one chip, not only the line isochronism but also real time performance in system performance (real time performance as a system for interrupt handling and the like in CPU, for example) and real time performance in display performance (real time performance in frame transfer) are required at the same time.

Furthermore, an aggregation of a main memory has advanced for the purpose of cost reduction. One chip to which a high-speed dynamic random access memory (DRAM) is connected and which is shared in a system causes a concentration of all data transfers to a main memory. In an MFP, it is therefore necessary to use an arbiter for a data transfer between each master and a main memory, control a quality of service (QOS), and ensure line isochronism, real time performance in system performance, and real time performance in display performance.

In a conventional MFP, a priority level of an access to a main memory by a master in regard to the line isochronism which should be most prioritized is raised to ensure the line isochronism. In the MFP, an idle period in which a master whose line isochronism should be secured within one line is not able to access the main memory is set and a data transfer (page isochronism and system transfer) which should be next prioritized is permitted within the idle time by an arbiter at such a level as not to affect the line isochronism to ensure the real time performance in system performance and the real time performance in display performance.

However, the conventional MFP has nothing more than a configuration in which the line isochronism is most prioritized and other transfers are made to intervene between whiles. There is a possibility that the real time performance in the system performance, the page transfer, and the frame transfer cannot be ensured depending on a frequency of a request for accessing a memory in regard to the line isochronism.

For example, a control IC of the MFP transfers a print image as the highest priority to a plotter engine that operates in synchronization with a line synchronization signal in a normal print operation. Since a wait time called "blanking period" until a start of a next line transfer is present in a line synchronization signal, the control IC is able to perform a transfer processing whose priority level is low during the wait time. Even in the middle of the print operation, it is thus possible to realize a rendering processing of a print image on another page, a processing of the CPU, an operation unit display processing by a graphics processing unit (GPU), and the like.

In contrast, in a special operation such as a 180-degree rotating print operation, a processing of spreading an expanded image on a main memory for rotating the expanded image by 180 degrees is performed before outputting the image to the plotter engine. Since a decoder reads out codes from the main memory without cease and writes an image after expansion in the main memory in this operation, there is a possibility of occupying a memory bandwidth. Therefore, there arises a problem in this operation that a performance in a data transfer whose priority level is low to the main memory significantly degrades and a performance in an entire system degrades even though functions of the 180-degree rotating print operation can be provided.

Though there are some methods for solving the problem, it is difficult in any of the methods to realize a compatibility with the transfer to the plotter engine. For example, a way of making a memory priority level of a decoder equivalent to the priority levels of the other modules such as a CPU can be considered. In this case, since the CPU and the other modules are able to access the main memory even in the middle of the 180-degree rotating print operation, it is possible to avoid the degradation in the performance of the entirety of the system. However, there is a case where an expansion processing performance is not ready in time for an output performance of the plotter engine and an abnormal image, for example, is thereby caused, depending on the operational condition of the CPU and the other modules.

In addition, another way of raising the priority levels of some modules (CPU and GPU, for example) higher than the priority level of the image data transfer can be considered. In this case, since the CPU processing is not interrupted and an operation unit rendering processing of the GPU is not interrupted, either even in the middle of the 180-degree rotating print operation, it is possible to avoid the degradation in the system from a perspective of a user. However, an expansion processing performance is not ready in time for an output performance of the plotter engine depending on the operational contents of the CPU and the GPU. Though this way is effective when the limit performance of the CPU and the GPU is sufficiently low, it becomes impossible to apply this way since it is expected that the limit performance of the CPU and the GPU to be mounted on a future MFP reaches higher.

Therefore, there is a need for a data processing device and a data processing method that enable, while ensuring an access to a memory by a master of high priority, other masters to effectively access to the memory.

SUMMARY OF THE INVENTION

It is an object of the present invention to at least partially solve the problem in the conventional technology.

According to an embodiment, there is provided a data processing device that includes a first sub-arbiter configured to arbitrate an access by first and second masters that access data stored in a memory; a second sub-arbiter configured to arbitrate an access to the memory by a plurality of masters other than the first and the second masters; a main arbiter configured to prioritize the access to the memory by the first sub-arbiter over the access to the memory by the second sub-arbiter; and a limiting unit configured to limit an amount of the access to the memory by the second master within a preset range.

According to another embodiment, there is provided a data processing method in a data processing device that includes a first sub-arbiter configured to arbitrate an access by first and second masters that access data stored in a memory, and a second sub-arbiter configured to arbitrate an access to the memory by a plurality of masters other than the first and the second masters. The data processing method includes prioritizing the access to the memory by the first sub-arbiter over the access to the memory by the second sub-arbiter; and limiting an amount of the access to the memory by the second master within a preset range.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiment

An embodiment of the present invention will be explained in detail below with reference to the accompanying drawings. The present invention will not be limited to the embodiment.

Figure 1:
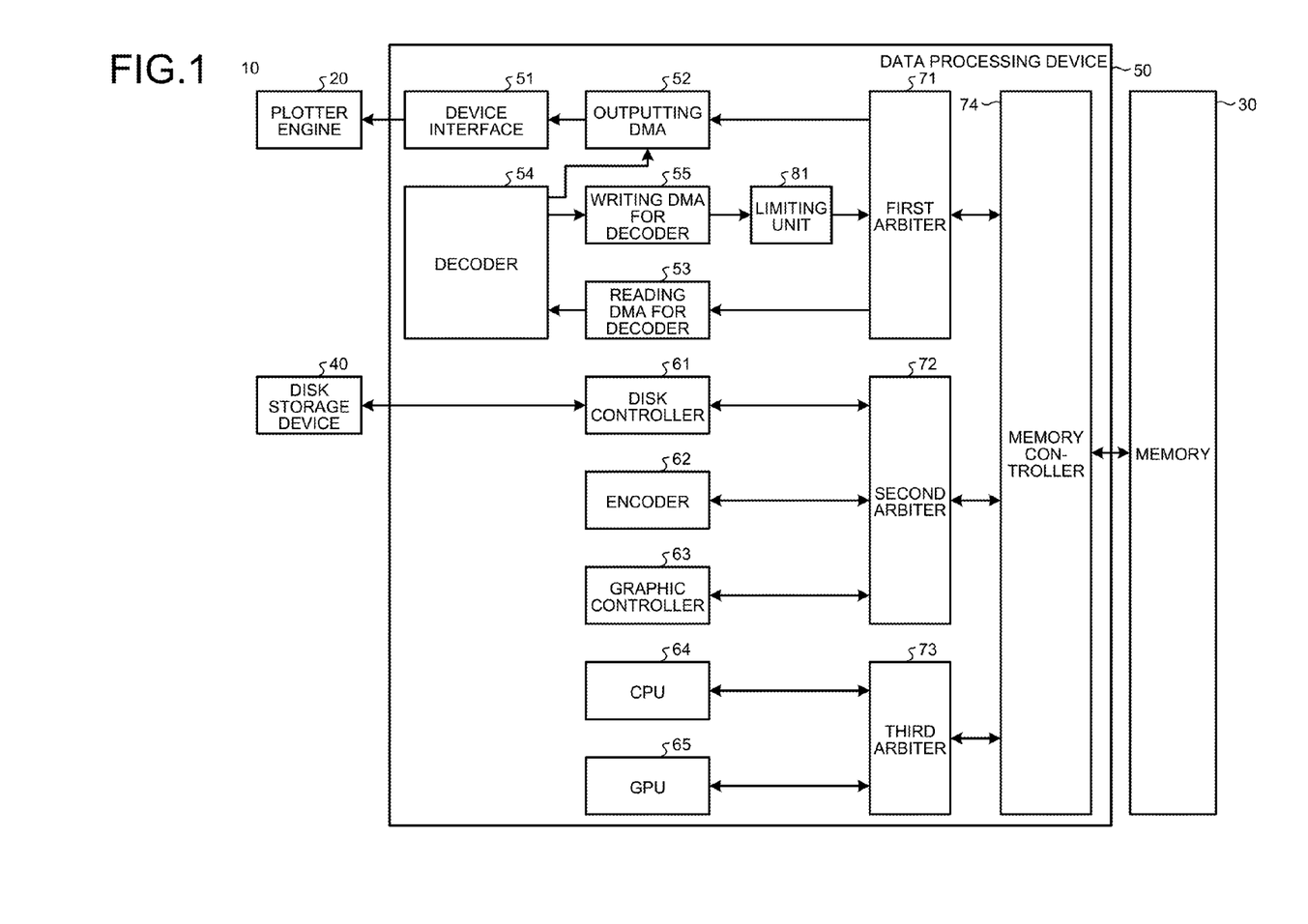
FIG. 1 illustrates a configuration of an image processing system 10 according to an embodiment.

FIG. 1 illustrates a configuration of an image processing system 10 according to an embodiment. An image processing system 10 is a control device that is used for a multifunction peripheral and the like provided with a scanner and a plotter. The image processing system 10, for example, obtains image data taken from the scanner and outputs the image data to the plotter.

The image processing system 10 is provided with a plotter engine 20, a memory 30, a disk storage device 40, and a data processing device 50. The plotter engine 20 controls an image forming operation by the plotter. The plotter engine 20 operates in synchronization with a line synchronization signal indicating operation timing for each line of an image signal.

The memory 30 is, for example, a DRAM. The memory 30 stores image data which is a processing target of the data processing device 50, print code data which is data coded for printing, and the like. The disk storage device 40 is, for example, a hard disk drive. The disk storage device 40 stores print code data and the like.

The data processing device 50 is, for example, a one-chip circuit. The data processing device 50 controls the entire system of the multifunction peripheral, a display of a display monitor, a rendering processing of a print image, and the like. The data processing device 50 also outputs image data to the plotter engine 20 while ensuring a line isochronism in the print operation.

The data processing device 50 is provided with a device interface 51, an outputting direct memory access (DMA) 52, a reading DMA for decoder 53, a decoder 54, a writing DMA for decoder 55, a disk controller 61, an encoder 62, a graphic controller 63, a CPU 64, a GPU 65, a first arbiter 71, a second arbiter 72, a third arbiter 73, and a memory controller 74.

The device interface 51 is an interface circuit that transmits and receives data with the plotter engine 20. The device interface 51 is an interface circuit of a PCI express standard, in one instance.

The outputting DMA 52 reads out data stored in the memory 30 and transfers the data to the plotter engine 20 via the device interface 51. In this case, the outputting DMA 52 accesses the memory 30 via the first arbiter 71 and the memory controller 74. The outputting DMA 52 secures a real time performance on a line-by-line basis (line isochronism), reads out the image data stored in the memory 30, and transfers the image data to the plotter engine 20.

The outputting DMA 52 obtains the image data output from the decoder 54 and outputs the image data to the plotter engine 20 via the device interface 51. The outputting DMA 52 secures the line isochronism and transfers the image data to the plotter engine 20 in this case, too.

The reading DMA for decoder 53 reads out and transfers to the decoder 54 the print code data stored in the memory 30. In this case, the reading DMA for decoder 53 accesses the memory 30 via the first arbiter 71 and the memory controller 74. The reading DMA for decoder 53 secures the line isochronism in data transfer.

The decoder 54 performs an expansion processing on the print code data supplied from the reading DMA for decoder 53 and generates image data. The decoder 54 then outputs the expanded image data to the outputting DMA 52 in a normal print operation.

In an operation, such as a 180-degree rotating print operation, of printing image data on which an image processing is performed, the decoder 54 performs a predetermined image processing on the expanded image data and outputs the image data to the writing DMA for decoder 55.

The writing DMA for decoder 55 reads out and writes in the memory 30 the image data on which the image processing is performed by the decoder 54 in the operation such as the 180-degree rotating print operation. In this case, the writing DMA for decoder 55 accesses the memory 30 via the first arbiter 71 and the memory controller 74.

The disk controller 61 controls data communication with the disk storage device 40. The disk controller 61 controls a transfer of print code data between the memory 30 and the disk storage device 40. In this case, the disk controller 61 accesses the memory 30 via the second arbiter 72 and the memory controller 74. The disk controller 61 secures a real time performance on a page-by-page basis (page isochronism) in data transfer.

The encoder 62 reads out the image data stored in the memory 30, compresses the read image data to generate print code data, and writes back the print code data in the memory 30. In this case, the encoder 62 accesses the memory 30 via the second arbiter 72 and the memory controller 74. The encoder 62 secures the page isochronism and executes a compression processing and the like.

The graphic controller 63 reads out image data from the memory 30, performs a rendering processing, and writes back the image data after the rendering processing in the memory 30. In this case, the graphic controller 63 accesses the memory 30 via the second arbiter 72 and the memory controller 74. The graphic controller 63 secures the page isochronism and executes a compression processing and the like.

The CPU 64 controls the entirety of the system of the multifunction peripheral and the like in which the image processing system 10 is provided. The CPU 64 reads out and executes instructions and the like from the memory 30. In this case, the CPU 64 accesses the memory 30 via the third arbiter 73 and the memory controller 74.

The GPU 65 displays a user interface in a display input device provided in the system such as the multifunction peripheral and accepts an operational input to the display input device. The GPU 65 reads out from the memory 30 and displays information for displaying the user interface. In this case, the GPU 65 accesses the memory 30 via the third arbiter 73 and the memory controller 74.

The first arbiter 71 arbitrates an access to the memory 30 by the outputting DMA 52, the reading DMA for decoder 53, and the writing DMA for decoder 55. Specifically, the first arbiter 71 arbitrates a data transfer in which the outputting DMA 52, the reading DMA for decoder 53, and the writing DMA for decoder 55 are masters and the memory controller 74 is a slave. The first arbiter 71 performs the arbitration in a round-robin fashion such as a least recently used (LRU), in one instance.

The first arbiter 71 is connected to a port whose priority level is the highest in the memory controller 74. The first arbiter 71 functions as a sub-arbiter that determines what access to accept from the outputting DMA 52, the reading DMA for decoder 53, or the writing DMA for decoder 55.

The second arbiter 72 arbitrates an access to the memory 30 by the disk controller 61, the encoder 62, and the graphic controller 63. Specifically, the second arbiter 72 arbitrates a data transfer in which the disk controller 61, the encoder 62, and the graphic controller 63 are masters and the memory controller 74 is a slave.

The second arbiter 72 performs the arbitration in a round-robin fashion, in one instance. The second arbiter 72 is connected to a port whose priority level is the second highest in the memory controller 74. The second arbiter 72 functions as a sub-arbiter that determines what access to accept from the disk controller 61, the encoder 62, or the graphic controller 63.

The third arbiter 73 arbitrates an access to the memory 30 by the CPU 64 and the GPU 65. Specifically, the third arbiter 73 arbitrates a data transfer in which the CPU 64 and the GPU 65 are masters and the memory controller 74 is a slave.

The third arbiter 73 performs the arbitration in a round-robin fashion, in one instance. The third arbiter 73 is connected to a port whose priority level is the lowest in the memory controller 74. The third arbiter 73 functions as a sub-arbiter that determines what access to accept from the CPU 64 or the GPU 65.

The memory controller 74 controls the access to the memory 30 by the first arbiter 71, the second arbiter 72, and the third arbiter 73. Specifically, the memory controller 74 sets the priority level of the access from the first arbiter 71 to be the highest, the priority level of the access from the second arbiter 72 to be the second highest, and the priority level of the access from the third arbiter 73 to be the lowest.

More specifically, the memory controller 74 prioritizes the access to the memory 30 by the first arbiter 71 over the accesses to the memory 30 by the second arbiter 72 and the third arbiter 73. The memory controller 74 also prioritizes the access to the memory 30 by the second arbiter 72 over the access to the memory 30 by the third arbiter 73. The memory controller 74 functions as a main arbiter that determines what access to access from the first arbiter 71, the second arbiter 72, or the third arbiter 73.

The limiting unit 81 limits an amount of a writing access to the memory 30 by the writing DMA for decoder 55 within a range of a preset bandwidth. For example, the limiting unit 81 limits, within the present bandwidth, an access in writing back the image data on which the image processing is performed to the memory 30 in the 180-degree rotating print operation and the like. An example of a method of limiting the bandwidth by the limiting unit 81 will be explained in detail later.

Figure 2:
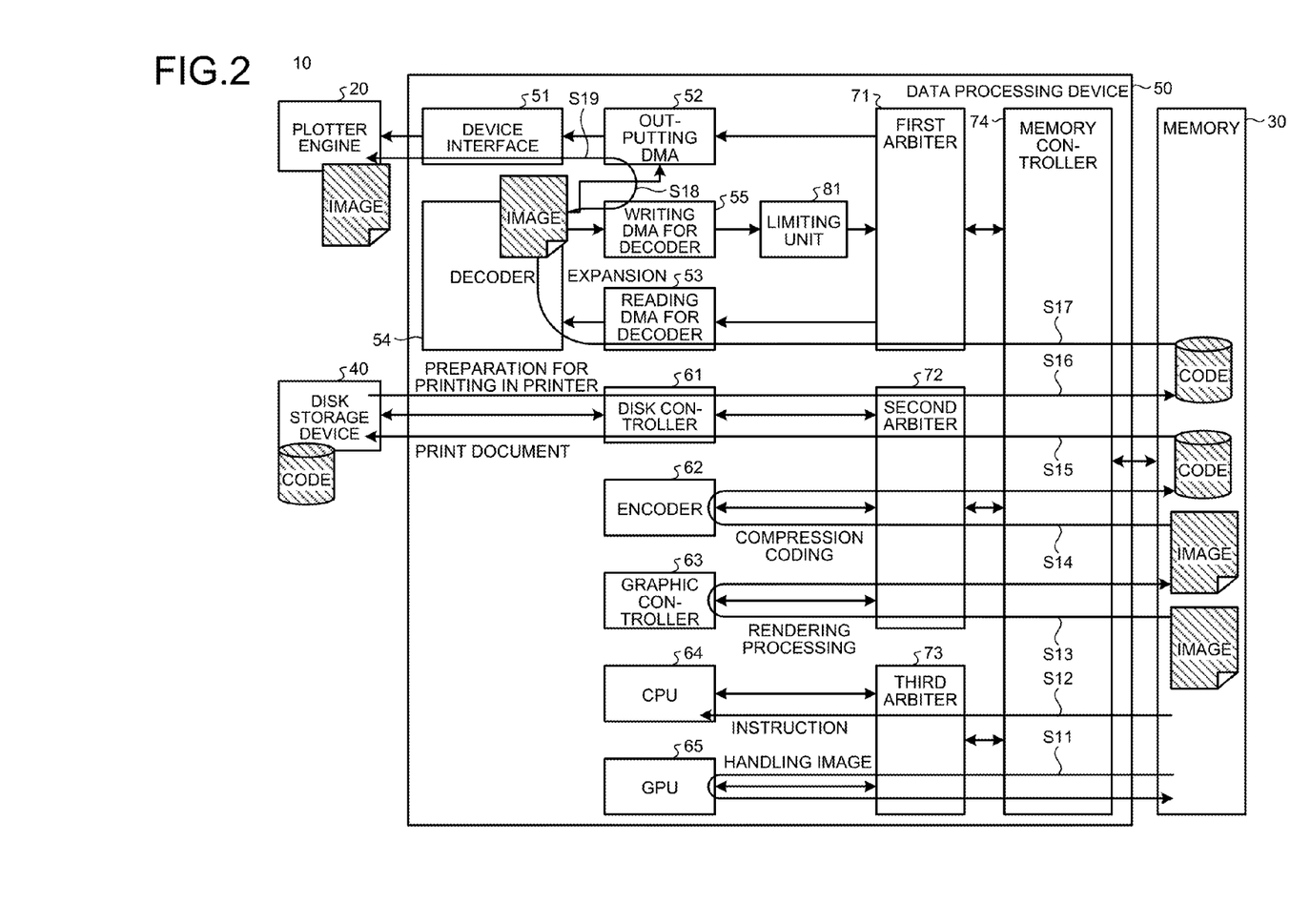
FIG. 2 illustrates a flow of data in the image processing system 10 in a normal print operation.

FIG. 2 illustrates a flow of data in the image processing system 10 in a normal print operation. The image processing system 10 performs a processing in the normal print operation as follows.

The GPU 65 reads out a handling image from the memory 30 and displays a user interface in the display input unit (S11). The GPU 65 then writes input information in the memory 30. The CPU 64 reads out from the memory 30 and executes instructions and writes a result of the execution in the memory 30 (S12).

The graphic controller 63 reads out image data from the memory 30, performs thereon a rendering processing, and writes the image data after the rendering processing in the memory 30 (S13). The encoder 62 then reads out the image data after the rendering processing from the memory 30, performs a compression coding processing thereon to generate print code data, and writes the print code data in the memory 30 (S14).

The disk controller 61 next reads out the print code data from the memory 30 and writes the print code data in the disk storage device 40 as a print document (S15). When a preparation for printing in the printer is started, the disk controller 61 reads out the print code data from the disk storage device 40 and writes the print code data in the memory 30 (S16).

The reading DMA for decoder 53 next reads out the print code data from the memory 30 and transfers the print code data to the decoder 54 (S17). The decoder 54 performs an expansion processing on the pint code data to generate image data (S18). The outputting DMA 52 then outputs the image data expanded by the decoder 54 to the plotter engine 20 via the device interface 51 (S19).

Figure 3:
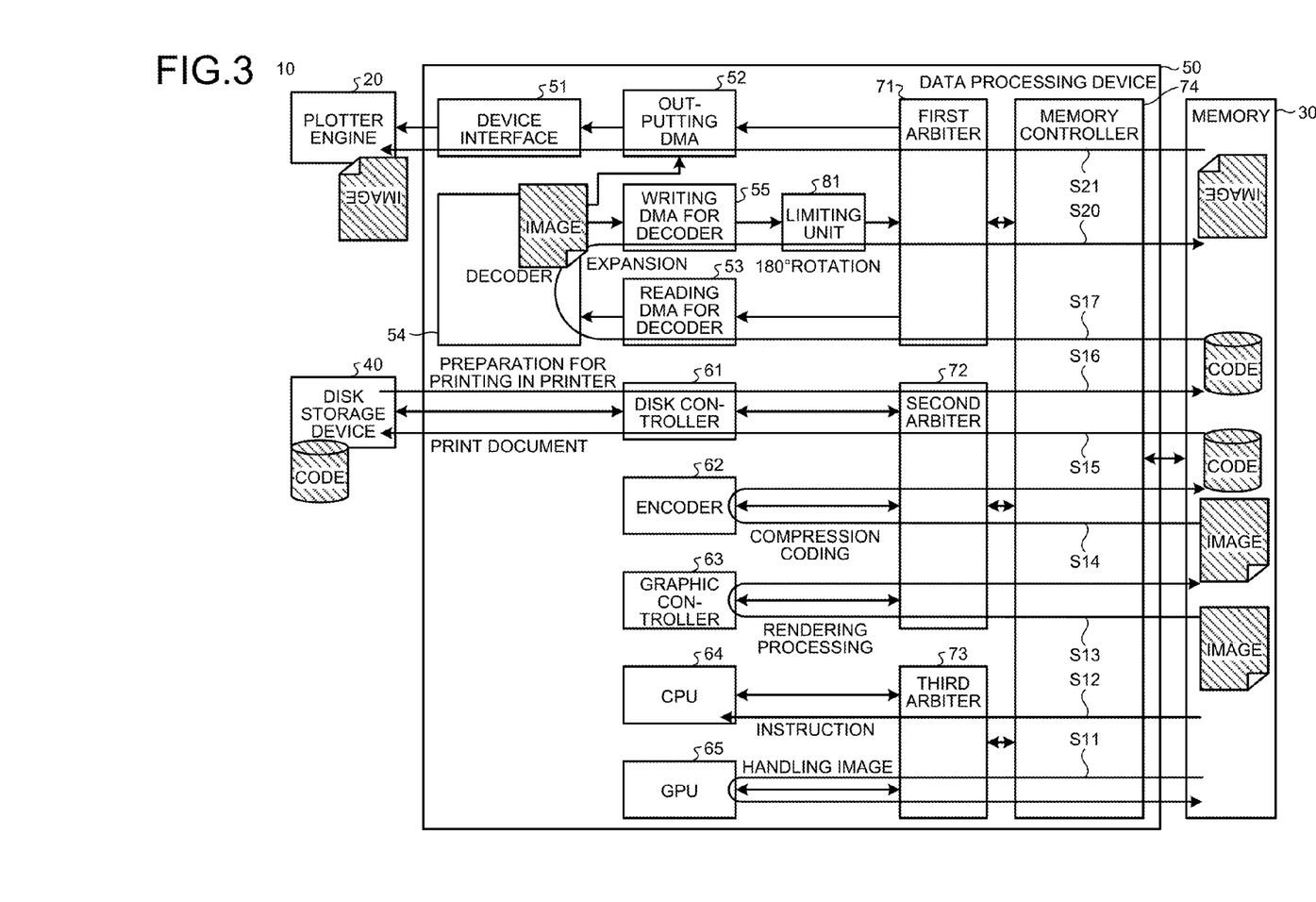
FIG. 3 illustrates a flow of data in the image processing system 10 in a 180-degree rotating print operation.

FIG. 3 illustrates a flow of data in the image processing system 10 in the 180-degree rotating print operation. The image processing system 10 performs a processing in the 180-degree rotating print operation as follows.

First, the same steps from S11 to S17 as the processing illustrated in FIG. 2 are executed. The decoder 54 then performs an expansion processing on the print code data read out by the reading DMA for decoder 53 to generate image data and inverts the image data by 180 degrees. The writing DMA for decoder 55 writes the 180-degree inverted image data in the memory 30 (S20). The outputting DMA 52 then reads out the 180-degree inverted image data from the memory 30 and outputs the image data to the plotter engine 20 via the device interface 51 (S21).

Figure 4:
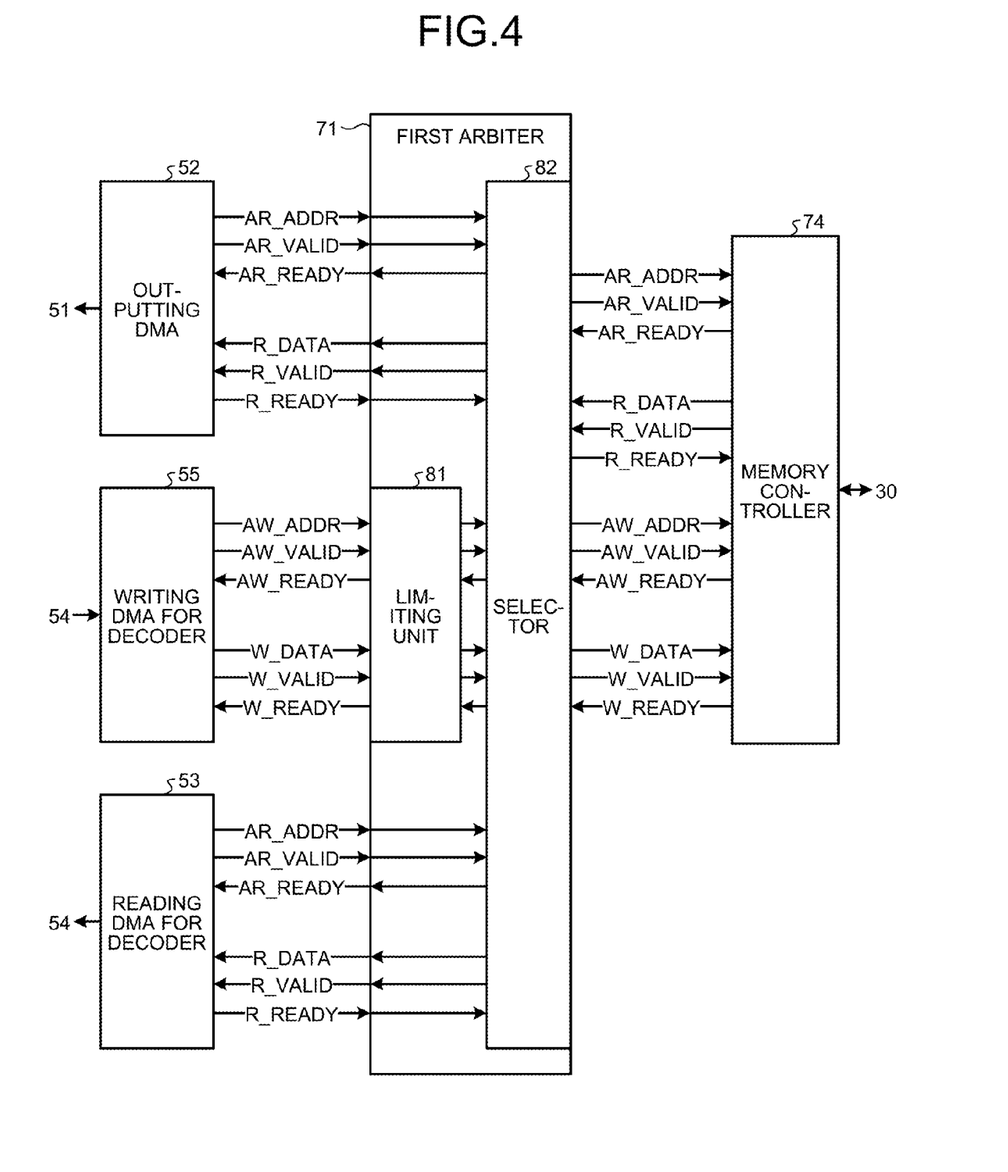
FIG. 4 illustrates a partial configuration of the image processing system 10 when a limiting unit 81 is provided at a port for bus connection of a first arbiter 71.

FIG. 4 illustrates a partial configuration of the image processing system 10 when the limiting unit 81 is provided at a port for bus connection in the first arbiter 71. The limiting unit 81 is, in one instance, provided at a port for bus connection with the writing DMA for decoder 55 which is a master as a target of the bandwidth limitation in the first arbiter 71. In this case, the first arbiter 71 is provided with the limiting unit 81 and a selector 82.

The selector 82 selects any one of a plurality of masters (the outputting DMA 52, the reading DMA for decoder 53, and the writing DMA for decoder 55) and connects the selected master to the slave (the memory controller 74). Here, a communication protocol between the slave and the plurality of masters in the selector 82 is a protocol using a split transaction such as an advanced extensible interface (AXI) and an open core protocol (OCP). The split transaction is a transfer in which a transfer request and a data transfer are split.

The limiting unit 81 is inserted between the selector 82 and the writing DMA for decoder 55. In controlling a writing access to the memory 30 by the writing DMA for decoder 55, the limiting unit 81 negates (invalidates) a ready response to a transfer request from the writing DMA for decoder 55. The limiting unit 81 is thus able to keep an effective data transfer from the writing DMA for decoder 55 on standby and limit the writing access.

Figure 5:
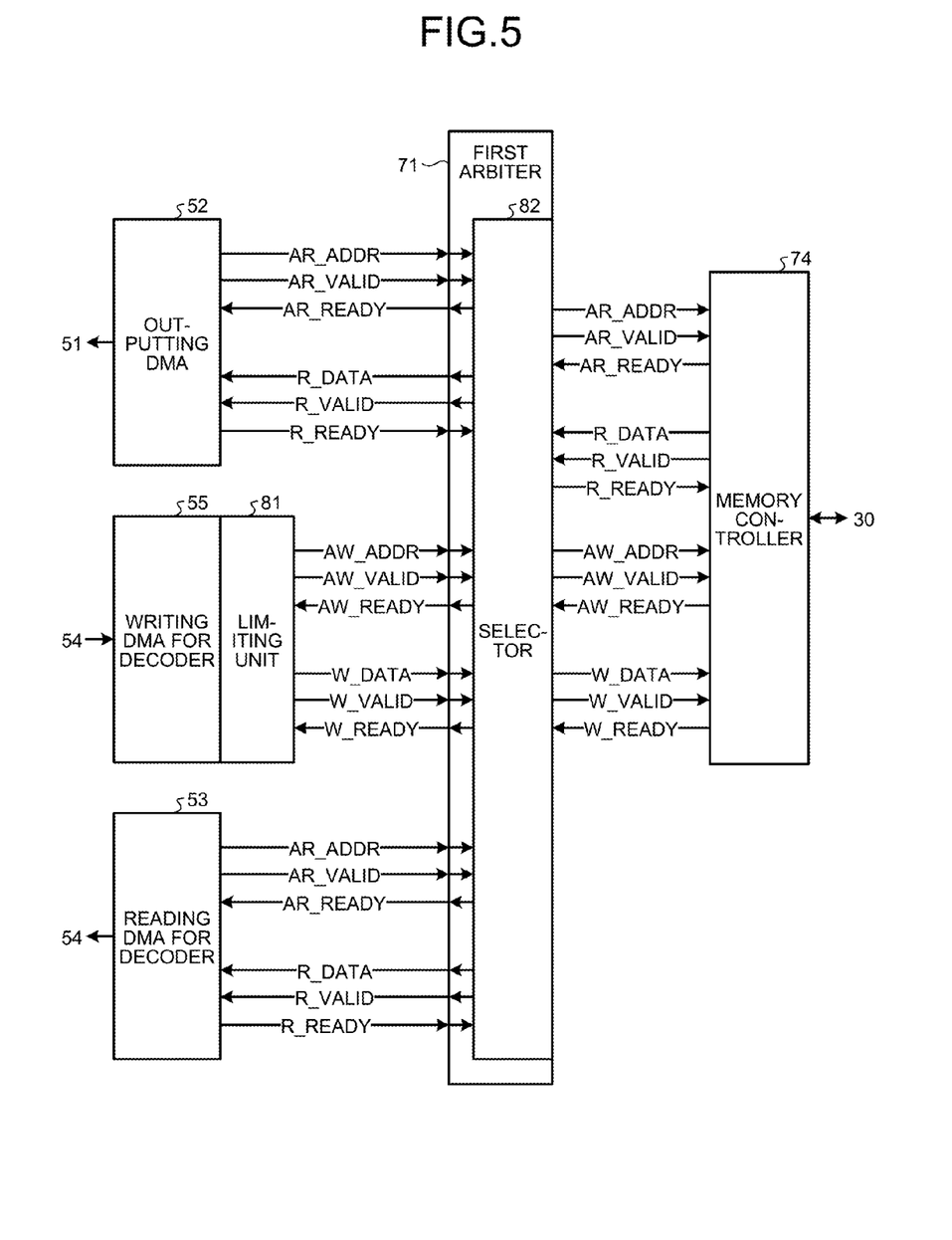
FIG. 5 illustrates a partial configuration of the image processing system 10 when the limiting unit 81 is provided at a port for bus connection of a writing DMA for decoder 55.

FIG. 5 illustrates a partial configuration of the image processing system 10 when the limiting unit 81 is provided at a port for bus connection in the writing DMA for decoder 55.

The limiting unit 81 may be provided at a port for bus connection with the selector 82 in the writing DMA for decoder 55 which is a master as a target of the limitation. In this case, the first arbiter 71 does not include the limiting unit 81. An explanation of the selector 82 is omitted here since the selector 82 is the same as what is illustrated in FIG. 4.

The limiting unit 81 is inserted between an input/output port of the writing DMA for decoder 55 and the selector 82. In limiting a writing access to the memory 30 by the writing DMA for decoder 55, the limiting unit 81 negates (invalidates) a ready response to a transfer request from the writing DMA for decoder 55. The limiting unit 81 is thus able to keep an effective data transfer from the writing DMA for decoder 55 on standby and limit the writing access.

Figure 6:
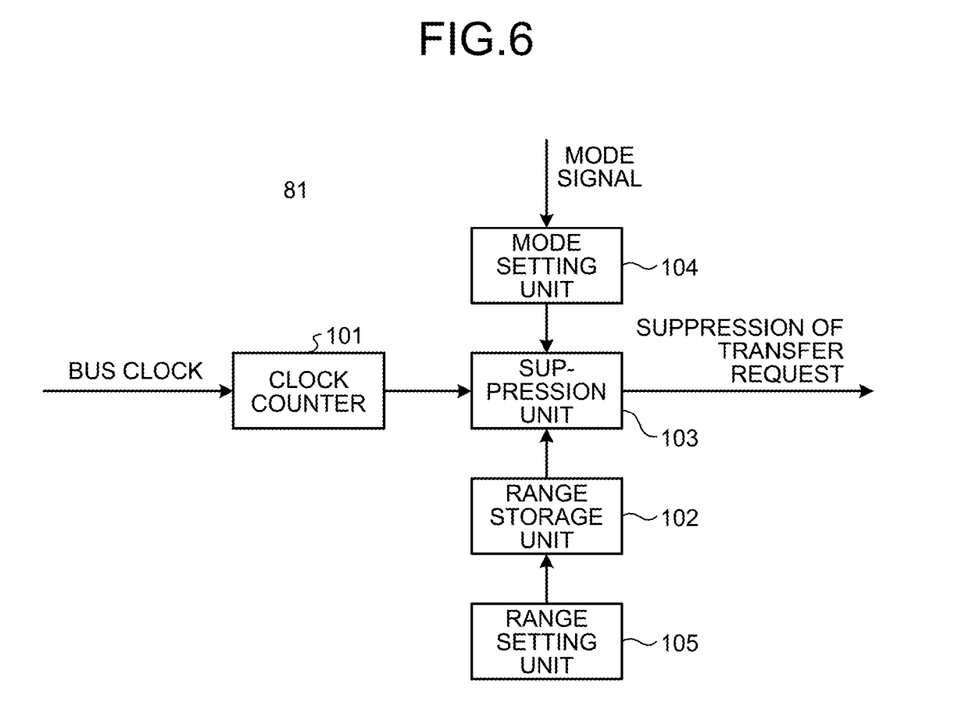
FIG. 6 illustrates a configuration of a limiting unit 81 according to a first example.

FIG. 6 illustrates a configuration of a limiting unit 81 according to a first example. The limiting unit 81 according to the first example measures the number of cycles of a bus clock and determines whether to permit the transfer by the writing DMA for decoder 55 based on a result of a comparison with the predetermined number of cycles.

Specifically, the limiting unit 81 according to the first example is provided with a clock counter 101, a range storage unit 102, a suppression unit 103, a mode setting unit 104, and a range setting unit 105.

The clock counter 101 counts a bus clock between the first arbiter 71 and the writing DMA for decoder 55. The clock counter 101 performs the counting within a range of a given value in a cyclic manner. The clock counter 101 repetitively performs the counting within a range of "0 to 255" for example in a case of eight-bit binary counter. The range storage unit 102 stores in advance the range of the count value of the clock counter 101. The range storage unit 102 stores a partial range in the entire range of the clock counter 101 (range of "64 to 128" in the case of the eight-bit binary counter), for example.

The suppression unit 103 blocks the access to the memory 30 by the writing DMA for decoder 55 and suppresses the transfer request when the value counted by the clock counter 101 is within the range stored in the range storage unit 102. In the case where the count range of the clock counter 101 is "0 to 255" and the arrange stored in the range storage unit 102 is "64 to 128", the suppression unit 103 transmits the writing access by the writing DMA for decoder 55 when the count value is "0 to 63" and "from 129 to 255" and blocks the writing access by the writing DMA for decoder 55 when the count value is within the range of "64 to 128".

The mode setting unit 104 sets whether to enable the limitation by the limiting unit 81. The suppression unit 103 limits the writing access by the writing DMA for decoder 55 when the mode setting unit 104 makes such a setting as to enable the limitation. The suppression unit 103 does not limit the writing access by the writing DMA for decoder 55 when the mode setting unit 104 makes such a setting as to disable the limitation.

The mode setting unit 104 may receive a mode signal indicating whether or not an external device is in operation and set whether to enable the limitation by the limiting unit 81 depending on the received mode signal. The mode setting unit 104 is thus able to limit the writing access by the writing DMA for decoder 55 when the external device is in operation and it is necessary to allow the external device to access the memory 30.

The range setting unit 105 sets a suppression range of the count value in the range storage unit 102. The range setting unit 105 sets a suppression range depending on an input from an outside, in one instance.

Figure 7:
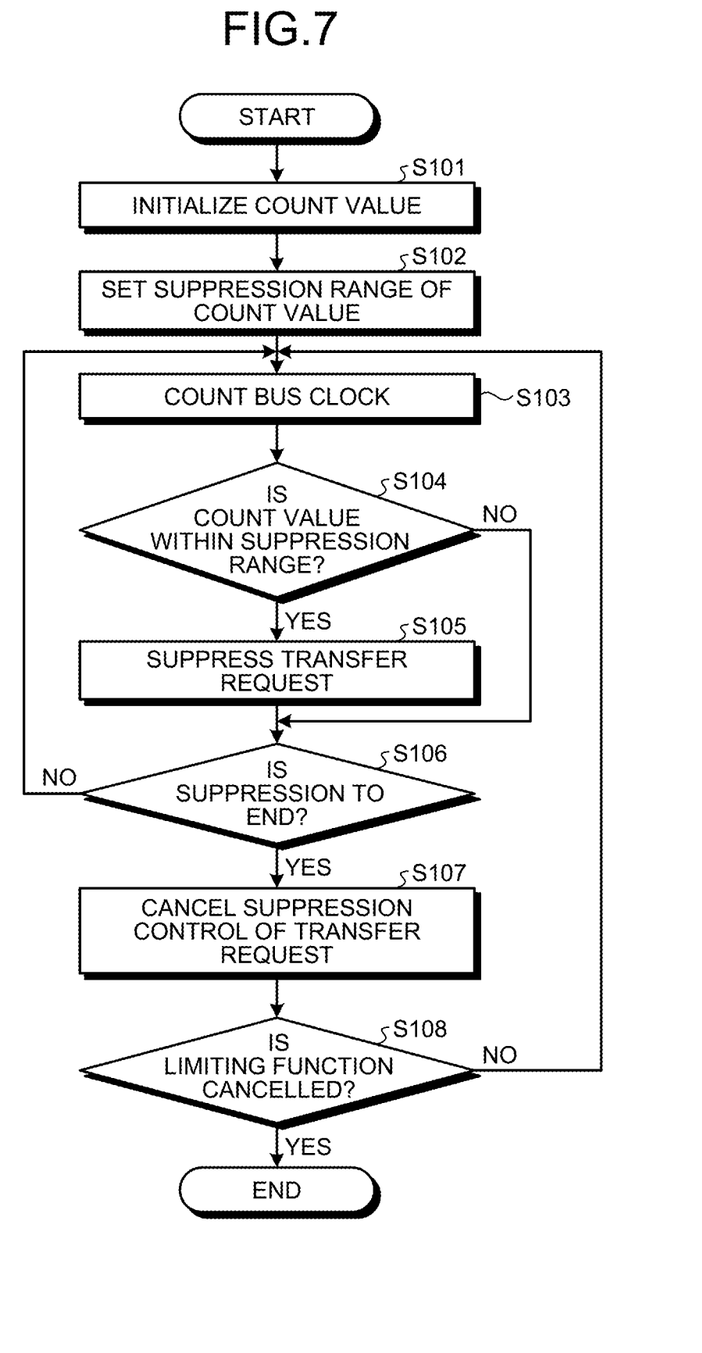
FIG. 7 is a flowchart of a processing of the limiting unit 81 according to the first example.

FIG. 7 is a flowchart of a processing of the limiting unit 81 according to the first example. The flow illustrated in FIG. 7 is executed by the limiting unit 81 when the writing access to the memory 30 by the writing DMA for decoder 55 occurs, for example.

First at step S101, the clock counter 101 initializes the count value to be "zero". Then at step S102, the range setting unit 105 sets the suppression range of the count value in the range storage unit 102.

Next at step S103, the clock counter 101 counts a bus clock. In this case, the clock counter 101 returns to the initial value "zero" and continues counting in a cyclic manner when the count value exceeds the maximum value.

At step S104, the suppression unit 103 then determines whether or not the count value is within the suppression range. When the count value is not within the suppression range ("No" at step S104), the suppression unit 103 moves to step S106. When the count value is within the suppression range ("Yes" at step S104), the suppression unit 103 moves to step S105. At step S105, the suppression unit 103 suppresses the transfer request of data to the memory 30 by the writing DMA for decoder 55. For example, the suppression unit 103 negates (invalidates) the ready response to the transfer request from the writing DMA for decoder 55.

At step S106, the suppression unit 103 then determines whether to end the suppression processing. The suppression unit 103 ends the suppression processing when a data transfer in response to the transfer request of data to the memory 30 by the writing DMA for decoder 55 is completed, in one instance. When not ending the suppression processing ("No" at step S106), the suppression unit 103 returns to step S103 and repeats the processing.

When ending the processing ("Yes" at step S106), the suppression unit 103 cancels the suppression control of the transfer request at step S107. At step S108, the suppression unit 103 then determines whether or not the bandwidth limitation is canceled. When the bandwidth limitation is not cancelled ("No" at step S108), the suppression unit 103 returns to step S103 and causes the bandwidth limitation to function continuously. When the bandwidth limitation is cancelled ("Yes" at step S108), the suppression unit 103 leaves this flow. According to the limiting unit 81 with this configuration, it is possible with an easy hardware configuration to limit an access bandwidth.

Figure 8:
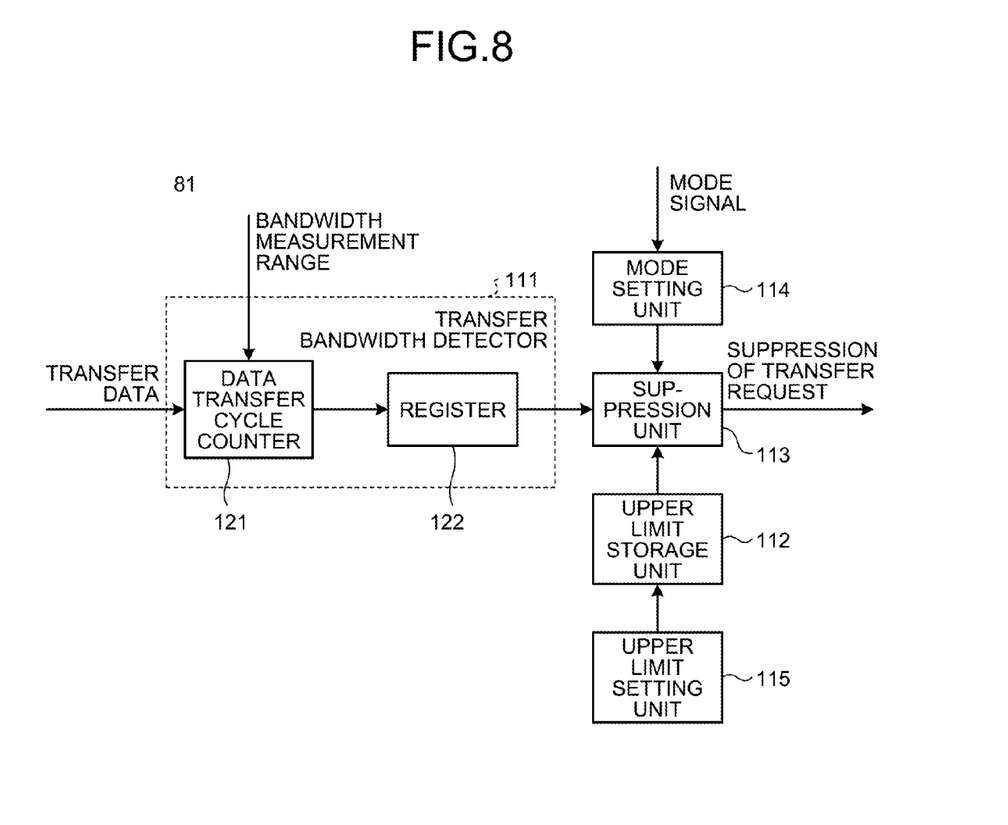
FIG. 8 illustrates a configuration of a limiting unit 81 according to a second example.

FIG. 8 illustrates a configuration of a limiting unit 81 according to a second example. A limiting unit 81 according to the second example uses a counter that accumulates a data transfer amount within the latest certain period to compute a data transfer amount per unit time (i.e., a transfer bandwidth) and determines whether to permit the transfer by the writing DMA for decoder 55 based on a result of a comparison with a predetermined transfer bandwidth.

The limiting unit 81 according to the second example is provided with a transfer bandwidth detector 111, an upper limit storage unit 112, a suppression unit 113, a mode setting unit 114, and an upper limit setting unit 115.

The transfer bandwidth detector 111 detects a data transfer bandwidth between the first arbiter 71 and the writing DMA for decoder 55. The transfer bandwidth detector 111 is provided with a data transfer cycle counter 121 and a register 122, in one instance.

The data transfer cycle counter 121 counts the number of pieces of transfer data within a set bandwidth measurement range. For example, the data transfer cycle counter 121 sets a range of 1000 cycles as the bandwidth measurement range. The data transfer cycle counter 121 then counts the number of data transfer cycles per 1000 cycles. For example, the data transfer cycle counter 121 outputs 100 cycles as the number of data transfer cycles when the data transfer is performed by 100 cycles of the 1000 cycles.

The register 122 retains the count value output from the data transfer cycle counter 121. The transfer bandwidth detector 111 outputs the count value of the register 122 as a data transfer bandwidth. The upper limit storage unit 112 stores in advance an upper limit of the data transfer bandwidth. The upper limit storage unit 112 stores 200 cycles as an upper limit in a case of suppressing the access when data transfer is performed by not less than 20% of the 1000 cycles, for example.

The suppression unit 113 blocks the access to the memory 30 by the writing DMA for decoder 55 when the transfer bandwidth (count value) output by the transfer bandwidth detector 111 exceeds the upper limit of the transfer bandwidth stored in the upper limit storage unit 112. In a case where 20% is set as the upper limit of the transfer bandwidth, for example, the suppression unit 113 blocks the writing access by the writing DMA for decoder 55 when data transfer of not less than 200 cycles of the 1000 cycles is performed.

The mode setting unit 114 executes the same processing as the mode setting unit 104 illustrated in FIG. 6. The upper limit setting unit 115 sets the upper limit of the transfer bandwidth in the upper limit storage unit 112. The upper limit setting unit 115 sets the upper limit depending on an input from an outside, in one instance.

Figure 9:
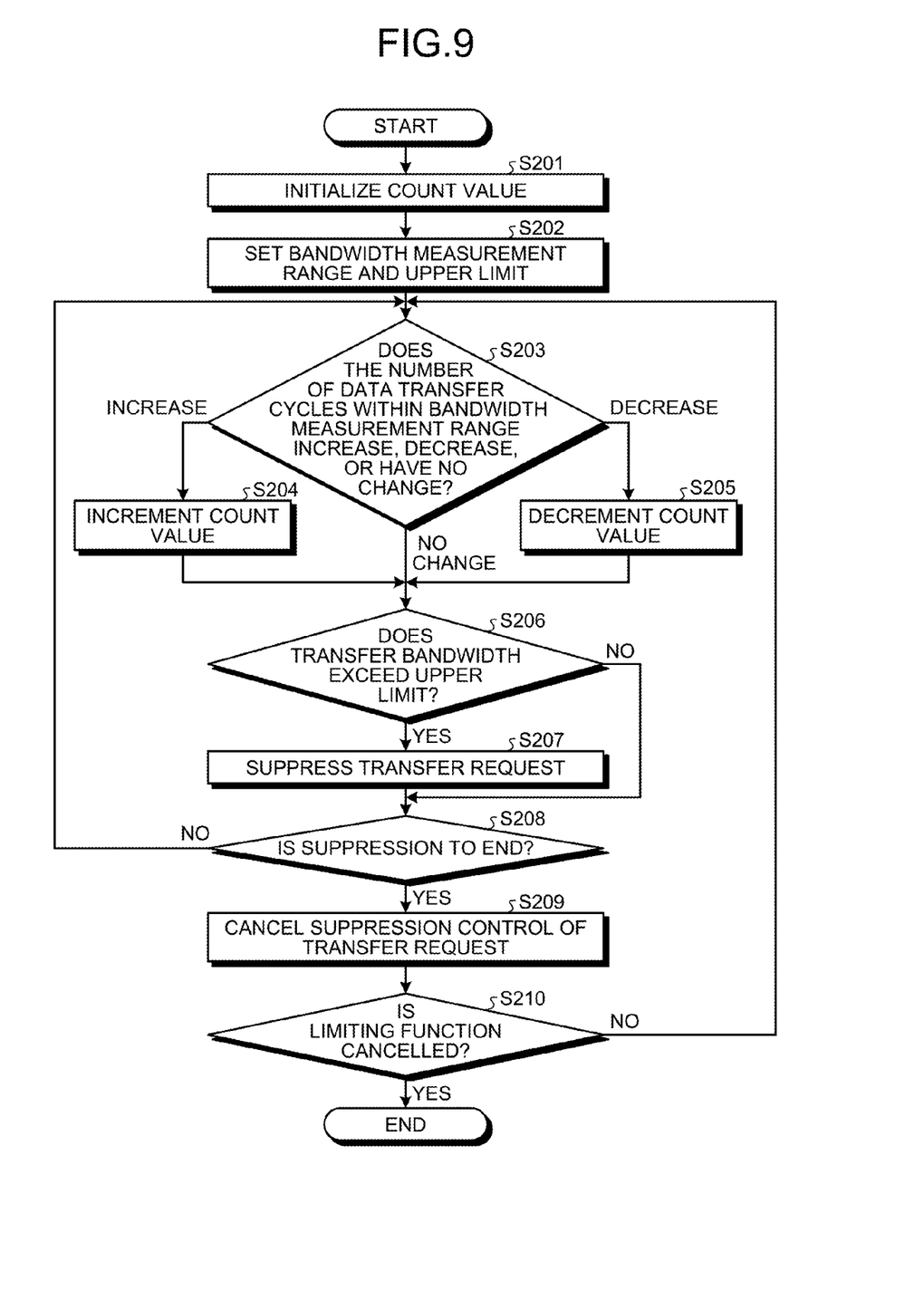
FIG. 9 is a flowchart of a processing of the limiting unit 81 according to the second example.

FIG. 9 is a flowchart of a processing of the limiting unit 81 according to the second example. The flow in FIG. 9 is executed by the limiting unit 81 when the writing access to the memory 30 by the writing DMA for decoder occurs, for example.

First at step S201, the data transfer cycle counter 121 initializes the count value to be "zero". Then at step S202, the data transfer cycle counter 121 sets the count value of the bandwidth measurement range. The upper limit setting unit 115 sets the upper limit of the transfer bandwidth in the upper limit storage unit 112.

Next at step S203, the data transfer cycle counter 121 counts the number of data transfer cycles within the bandwidth measurement range. The data transfer cycle counter 121 then determines whether the number of data transfer cycles per bandwidth measurement range increases, decreases, or has no change.

When the number of data transfer cycles increases ("increase" at step S203), the data transfer cycle counter 121 increments the count value at step S204 and moves to step S206. When the number of data transfer cycles decreases ("decrease" at step S203), the data transfer cycle counter 121 decrements the count value at step S205 and moves to step S206. When the number of data transfer cycles has no change ("no change" at step S203), the data transfer cycle counter 121 does not change the count value and moves to step S206.

At step S206, the suppression unit 113 then determines whether or not the transfer bandwidth exceeds the upper limit. When the transfer bandwidth does not exceed the upper limit ("No" at step S206), the suppression unit 113 moves to step S208. When the transfer bandwidth exceeds the upper limit ("Yes" at step S206), the suppression unit 113 moves to step S207. At step S207, the suppression unit 113 suppresses the data transfer request to the memory 30 by the writing DMA for decoder 55. For example, the suppression unit 113 negates (invalidates) the ready response to the transfer request from the writing DMA for decoder 55.

At step S208, the suppression unit 113 then determines whether to end the suppression processing. The suppression unit 113 ends the suppression processing when a data transfer in response to the data transfer request to the memory 30 by the writing DMA for decoder 55 is completed, in one instance. When not ending the suppression processing ("No" at step S208), the suppression unit 113 returns to step S203 and repeats the processing.

When ending the processing ("Yes" at step S208), the suppression unit 113 cancels the suppression control of the transfer request at step S209. At step S210, the suppression unit 113 then determines whether or not the bandwidth limitation is cancelled. When the bandwidth limitation is not cancelled ("No" at step S210), the suppression unit 113 returns to step S203 and causes the bandwidth limitation to function continuously. When the bandwidth limitation is cancelled ("Yes" at step S210), the limiting unit 81 leaves this flow. According to the limiting unit 81 with this configuration, it is possible to limit an access bandwidth with high precision though the configuration becomes complicated.

According to the embodiment, it is possible to enable, while ensuring an access to a memory by a master of high priority, other masters to effectively access to the memory.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing device, comprising:
   a first sub-arbiter configured to allow access to data by first and second masters, the data stored in a memory;
   a second sub-arbiter configured to allow access to the memory by a plurality of masters other than the first and the second masters;
   a main arbiter configured to prioritize the access to the memory by permitting the first sub-arbiter over the access to the memory by the second sub-arbiter; and
   a limiter configured to limit the access to the memory by the second master by invalidating a transfer request from the second master if a count value is within a range, wherein the limiter is between a selector and the second master, the selector is configured to,
   connect the second master to the main arbiter, and
   split the transfer request and a data transfer from the second master.

2. The data processing device according to claim 1, wherein
   the first master is configured to,
      read image data stored in the memory, and
      secure real time performance on a line-by-line basis while the image data is read;
   the second master is configured to write the image data in the memory, the image data having an image processing performed thereon; and
   the limiter is further configured to limit access for writing the image data to the memory by the second master if a transfer bandwidth is within a range of a given bandwidth.

3. The data processing device according to claim 1, wherein the limiter is at a port for bus connection in the first sub-arbiter.

4. The data processing device according to claim 1, wherein the limiter is at a port for bus connection in the second master.

5. The data processing device according to claim 1, wherein the limiter includes:
   a mode setter configured to determine whether to enable the range.

6. The data processing device according to claim 1, wherein the limiter is further configured to,
   limit access to the memory by the second master based on a mode signal, the mode signal indicating whether an external device is in operation, and
   allow access to the memory by the external device prior to the second master if the mode signal indicates that the external device is in operation.

7. The data processing device according to claim 1, wherein the limiter is further configured to,
   delay a data transfer from the second master if the transfer request is invalidated.

8. The data processing device according to claim 3, wherein the limiter includes,
   a clock counter configured to count a bus clock of a bus as the count value, the bus being between the first sub-arbiter and the second master,
   a range storage configured to store the range of the count value, the range is stored prior to counting the bus clock, and
   a suppressor configured to block the access to the memory by the second master if the count value of the clock counter is within the range stored in the range storage.

9. The data processing device according to claim 3, wherein the limiter includes,
   a transfer bandwidth detector configured to detect a data transfer bandwidth between the first sub-arbiter and the second master,
   an upper limit storage configured to store an upper limit of the data transfer bandwidth, and
   a suppressor configured to block the access to the memory by the second master if the transfer bandwidth detected by the transfer bandwidth detector exceeds the upper limit stored in the upper limit storage.

10. The data processing device according to claim 4, wherein the limiter includes,
    a clock counter configured to count a bus clock of a bus as the count value, the bus being between the first sub-arbiter and the second master,
    a range storage configured to store the range of the count value, the range is stored prior to counting the bus clock, and
    a suppressor configured to block the access to the memory by the second master if the count value of the clock counter is within the range stored in the range storage.

11. The data processing device according to claim 4, wherein the limiter includes,
    a transfer bandwidth detector configured to detect a data transfer bandwidth between the first sub-arbiter and the second master,
    an upper limit storage configured to store an upper limit of the data transfer bandwidth, and
    a suppressor configured to block the access to the memory by the second master if the transfer bandwidth detected by the transfer bandwidth detector exceeds the upper limit stored in the upper limit storage.

12. The data processing device according to claim 5, wherein the mode setter is further configured to,
    receive a mode signal indicating whether an external device is in operation, and
    determine whether to enable the range depending on the received mode signal.

13. A data processing method in a data processing device, the data processing device including a first sub-arbiter and a second sub-arbiter, the first sub-arbiter configured to allow access to data by first and second masters, the data stored in a memory, the second sub-arbiter configured to allow access to the memory by a plurality of masters other than the first and the second masters, the method comprising:
    prioritizing access to the memory by permitting the first sub-arbiter over the access to the memory by the second sub-arbiter; and
    limiting the access to the memory by the second master by invalidating a transfer request from the second master to a selector if a count value is within a range, the selector being between the first sub-arbiter and the second master.

14. A non-transitory computer readable medium having computer readable instructions stored thereon, when executed by at least one processor, configure the at least one processor to,
    allow access to data by first and second masters through at least one sub-arbiter, the data stored in a memory;
    allow access to the memory by a plurality of masters other than the first and second masters;
    prioritize access to the memory by having the first and second masters access the memory prior to the plurality of masters other than the first and second masters;
    limit access to the memory by the second master by invalidating a transfer request from the second master to a selector if a count value is within a range; and connect the second master to the memory if the count value is outside the range, the selector being between the second master and the at least one sub-arbiter.

15. The non-transitory computer readable medium of claim 14, wherein the at least one processor is further configured to, limit access to the memory by the second master based on a mode signal, the mode signal indicating whether an external device is in operation, and allow access to the memory by the external device prior to the second master if the mode signal indicates that the external device is in operation.

16. The non-transitory computer readable medium of claim 14, wherein the at least one processor is further configured to, delay a data transfer from the second master if the transfer request is invalidated.

17. The non-transitory computer readable medium of claim 14, wherein the at least one processor is further configured to, block the access to the memory by the second master if the count value is within the range.

18. The non-transitory computer readable medium of claim 14, wherein the at least one processor is further configured to, block the access to the memory by the second master if a transfer bandwidth is equal to or greater than an upper limit.

* * * * *